US012712728B2

(12) United States Patent
Augustyn et al.

(10) Patent No.: US 12,712,728 B2
(45) Date of Patent: Aug. 18, 2026

(54) SYSTEMS AND METHODS FOR THRESHOLD CRYPTOGRAPHY FOR CLOUD-BASED SOFTWARE-IMPLEMENTED HARDWARE SECURITY MODULES

(71) Applicant: ASSA ABLOY AB, Stockholm (SE)

(72) Inventors: Adam Augustyn, Krzeszowice (PL); Krzysztof Grzegorz Fabjanski, Bielsko-Biala (PL); Andrzej Bohdan Kostyk, Wieliczka (PL)

(73) Assignee: ASSA ABLOY AB, Stockholm (SE)

( * ) Notice: Subject to any disclaimer, the term of this patent is extended or adjusted under 35 U.S.C. 154(b) by 25 days.

(21) Appl. No.: 18/851,953

(22) PCT Filed: Mar. 30, 2022

(86) PCT No.: PCT/EP2022/058481

§ 371 (c)(1), (2) Date: Sep. 27, 2024

(87) PCT Pub. No.: WO2023/186298

PCT Pub. Date: Oct. 5, 2023

(65) Prior Publication Data

US 2025/0219828 A1 Jul. 3, 2025

(51) Int. Cl.
*H04L 9/08* (2006.01)

(52) U.S. Cl.
CPC ........... *H04L 9/0894* (2013.01); *H04L 9/085* (2013.01)

(58) Field of Classification Search
CPC ......... H04L 9/0894; H04L 9/085; H04L 9/14; H04L 9/0822; H04L 9/0825; H04L 2209/12; G09C 1/00
See application file for complete search history.

(56) References Cited

U.S. PATENT DOCUMENTS

2019/0342080 A1* 11/2019 Vakili .................... H04L 63/06
2021/0273789 A1* 9/2021 Lemercier ............. H04L 9/0825

FOREIGN PATENT DOCUMENTS

WO 2023186298 10/2023

OTHER PUBLICATIONS

"International Application Serial No. PCT EP2022 058481, International Search Report mailed Nov. 28, 2022", 3 pgs.

(Continued)

*Primary Examiner* — Sangseok Park
(74) *Attorney, Agent, or Firm* — Schwegman Lundberg & Woessner, P.A.

(57) ABSTRACT

Disclosed herein are systems and methods for threshold cryptography for cloud-based software-implemented hardware security modules. In an embodiment, an encryption system collects at least a decryption-threshold number of private-key shares from a secure store, where the private-key shares correspond to a public key generated in a first secure enclave as part of a secret key set, which also includes a first plural quantity of the private-key shares. The encryption system obtains an ephemeral-hardware-security-module-(eHSM)-encryption key by decrypting the collected private-key shares. The encryption system initializes, in a second secure enclave, a second instance of a first eHSM. The initialized second instance of the first eHSM is encrypted with the obtained eHSM-encryption key.

25 Claims, 5 Drawing Sheets

(56) References Cited

OTHER PUBLICATIONS

"International Application Serial No. PCT EP2022 058481, Written Opinion mailed Nov. 28, 2022", 7 pgs.
"Cyber Application of Attribute Based Encryption ABE for data protection on smart devices cloud and mobile services", ETSI Draft Specification 103 458 European Elecommunications Standards Institute ETSI 650 Route Des Lucioles F 06921 Sphia Ntipolis France vol. TC Cyber Cyber Security No. V0 0 11, [Online] Retrieved from the internet:docbox.etsi.org Cyber Cyber 70Drafts 0020 CYBER0020v0011.doc, (Jan. 24, 2018).
Dauterman, Emma, "SafetyPin Encrypted Backups with Human Memorable Secrets", Arxiv Org Cornell University Library 201 Olin Library Cornell University Ithaca NY 14853, (Mar. 8, 2021), 19 pgs.
Priebe, Christian, "EnclaveDB: A Secure Database Using SGX", IEEE Symposium on Security and Privacy SP, (May 1, 2018), 264-278.
Yaxing, Chen, "QShield Protecting Outsourced Cloud Data Queries With Multi User Access Control Based on SGX", IEEE Transactions on Parallel and Distributed Systems IEEE USA vol. 32, No. 2, (Sep. 18, 2020).

* cited by examiner

SYSTEMS AND METHODS FOR THRESHOLD CRYPTOGRAPHY FOR CLOUD-BASED SOFTWARE-IMPLEMENTED HARDWARE SECURITY MODULES

CROSS-REFERENCE TO RELATED APPLICATION(S)

This application is a national stage application under 35 U.S.C. § 371 of PCT Appl. No. PCT/EP2022/058481, titled "Systems and Methods for Threshold Cryptography for Cloud-Based Software-Implemented Hardware Security Modules," filed Mar. 30, 2022, which is incorporated herein by reference in its entirety.

TECHNICAL FIELD

Among other technical fields, embodiments of the present disclosure pertain to encryption, symmetric encryption, threshold cryptography, hardware security modules (HSMs), software implementations of hardware security modules ("soft HSMs"), cloud computing, and, more particularly, to systems and methods for threshold cryptography for cloud-based soft HSMs.

BACKGROUND

In today's modern society, there are many transactions and a great deal of computing in general that involves highly sensitive information. This information could be highly personal (e.g., identifying, medical, financial, etc.) in nature. In other cases, the information may relate to large financial transactions. In still other examples, the information may be or include important corporate secrets. And numerous other examples could be given as well. In some contexts, information that is to be protected is divided into categories such as "confidential," "classified," "top secret," and/or the like, and differing levels of security may be applied to different respective categories. Numerous options exist in the marketplace with respect to both hardware and software options for carrying on the processing of highly sensitive information. In connection with such options and more generally as well, it is important not only to maintain the secrecy of the underlying information, but also to consider tradeoffs with respect to convenience for one or more users. This convenience may pertain to factors such as the availability of the information, the accessibility of the information, and/or the like.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
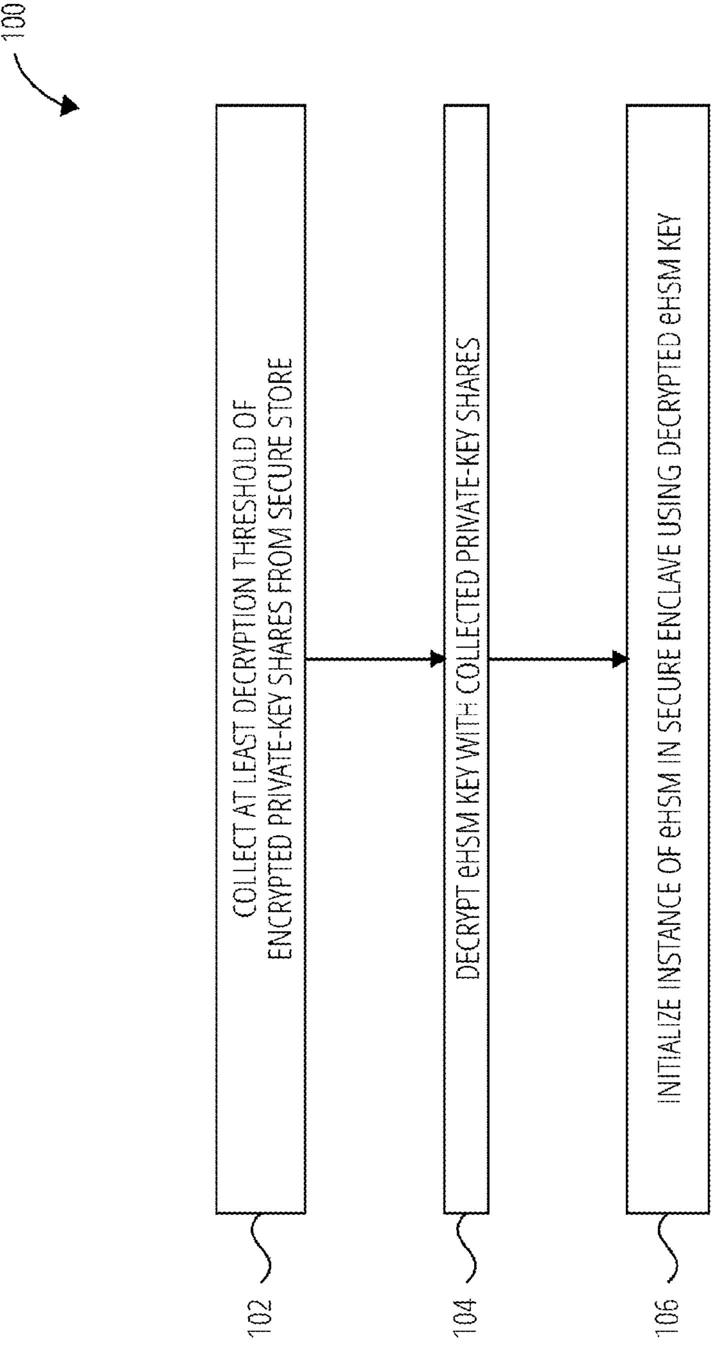
FIG. 1 depicts a first example method, in accordance with at least one embodiment.

There are multiple different cloud providers that each offer one or more trusted-environment options to their customers for secure computing. Each such option is an example of a different variety of what is referred to in the art as a trusted execution environment (TEE). In accordance with a first such option, a cloud provider may provide customers with the opportunity to use a dedicated and secure hardware circuit (on a host machine of the cloud provider) for performing calculations and/or other operations with respect to sensitive data. The associated hardware may be similar to a conventional HSM implementation, though typically without the features that make a conventional HSM physically tamper-proof (or at least tamper-resistant). A second cloud-based trusted-environment option may provide hardware on which a virtual machine (VM) can be created, where the VM is fully encrypted at runtime.

In the current marketplace, an example option along the lines of the above-described first option is provided by Microsoft Azure® and utilizes an Intel® Software Guard Extension (SGX). Example options similar to the above-described second option are currently provided by both (i) Microsoft Azure® (utilizing an Advanced Micro Devices® (AMD) EPYC® processor) and (ii) Google Cloud® (in the form of what that provider refers to as a "Confidential Virtual Machine," ™ also implemented in at least some cases using an AMD EPYC® processor). A third option, and the one of the three that is discussed most frequently herein in connection with embodiments of the present disclosure, is referred to in the art (and in the present disclosure) as an "enclave," a "secure enclave," and the like. It is noted, however, that embodiments of the present disclosure can just as well be carried out in other types of TEEs, such as those of the above-described first and second options.

To provide a secure enclave (as that term is used in the present disclosure), a given cloud provider may provide its customer with access to a TEE on hardware that is separate from the host hardware of the cloud provider. A given secure enclave may reside in a designated region of encrypted memory on the separate hardware. Moreover, in many implementations, the secure enclave is "read-only" from the perspective of the cloud-provider host machine. That is, in many implementations, the host machine of the cloud provider is unable to modify or otherwise control the operations being carried out in the secure enclave. Some secure enclaves are ephemeral in nature, as is more fully described below. Examples of ephemeral secure enclaves that are available at present are offered by Amazon Web Services® (AWS) and are known as Nitro Enclaves.™

The ephemeral nature of such secure enclaves is an aspect that can be both a blessing and a curse. As stated, these secure enclaves (and therefore the operations, processes, etc. being performed therein) are ephemeral, which as used herein essentially means that these secure enclaves typically execute in non-persistent memory. As such, a given executing secure enclave is typically irretrievably lost whenever a power outage, system crash, system restart, and/or one or more other similar events occurs in connection with the hardware on which the secure enclave is executing. This can be an advantage in that, from a security standpoint, the ephemeral nature of the processing shortens the time window within which a successful attack could be mounted by a malicious actor. Moreover, and also from a security standpoint, it can also be an advantage that the data is irretrievably lost. From a productivity standpoint, however, it can be a disadvantage that the data is irretrievably lost.

Thus, in addition to their security benefits, ephemeral secure enclaves also present challenges, prominent among which is the fact that an abrupt, unexpected, premature termination of such a secure enclave results in the irretrievable loss of whatever data, ongoing calculations, and/or the like were stored in the secure enclave at the time of that termination. For purposes of this disclosure, that sort of secure-enclave termination—i.e., abrupt and unexpected—is referred to herein as a "crashing" of the secure enclave. A secure enclave may crash due to power loss, system crash, and/or one or more other unplanned and unexpected secure-enclave-termination-causing events.

Among the many types of processes that may be executed in secure enclaves in general—and in particular that may be executing when a secure enclave crashes—are soft HSMs. Given the ephemeral nature of secure enclaves, a soft HSM that is executing in a secure enclave may be considered to be—and is referred to herein as—an "ephemeral HSM" (eHSM). It is noted that secure enclaves need not be ephemeral, and that embodiments of the present disclosure apply to non-ephemeral secure enclaves as well. For brevity, as a general matter, as used herein, a "secure enclave" is typically but not necessarily an ephemeral secure enclave.

Disclosed herein are embodiments of systems and methods for threshold cryptography for cloud-based soft HSMs (e.g., eHSMs). Among other inspirations and motivations, embodiments of the present disclosure arose in part from the realization and recognition that it can be advantageous to be able to reinitialize a given eHSM following a crash, where that reinitialization involves using the same encryption key that was used to initialize the crashed eHSM. It is further noted that, in the parlance of the present disclosure, "reinitializing" a given eHSM includes times where the initial eHSM has crashed as well as times where the initial eHSM has not crashed. In the latter case, the initial eHSM may have been terminated in a controlled fashion, or the initial eHSM (and/or one or more reincarnations of the initial eHSM) may still be executing at the time that an additional eHSM is "reinitialized."

Indeed, it is contemplated that there are advantages that can be realized from executing multiple instances of a given eHSM simultaneously, for purposes of load balancing, distribution of labor, parallel processing, and/or the like. Embodiments of the present disclosure further arose in part from the realization and recognition that the ability to reinitialize a given eHSM is facilitated by the storage of certain data in one or more places other than in the eHSM itself (or the secure enclave in which that eHSM is executing). Examples of such data (e.g., diversifiers) and options for storing it are more fully discussed below. In various different embodiments, such persistent elements being stored outside of the eHSM (and outside of its secure enclave) are used to recreate a given eHSM, or at least a fresh instance of it.

As is more fully described below, to facilitate the reinitialization of eHSMs in newly "spun up" secure enclaves, embodiments of the present disclosure make use of a technique that is known in the art as "threshold cryptography." Generally speaking, threshold cryptography relates to techniques that involve splitting a given private encryption key into multiple pieces that are referred to in the art as "shares." In language that is often used in the art, a private key may be split into n shares, where n is an integer greater than 1. Along with those n shares of the private encryption key, a corresponding public encryption key is also generated. At times in the present disclosure, a data structure referred to as a "secret key set" is described as including both the public key and the n shares of the corresponding private key.

In some instances, the n shares are not all stored in a single place; rather, in many implementations, each of the n shares is stored in a different geographic region of a multi-regional key management system (KMS). Furthermore, in at least one embodiment, another integer (m) is selected at the time of creating the secret key set. As explained more fully herein, in at least some embodiments, the selected integer m serves as a threshold number of the n shares needed for decryption. More particularly, and also in language that is often used in the art, in at least some embodiments, a successful decryption (of a cryptogram that has been encrypted using the public key from the secret key set) requires that at least m of the n shares be gathered for use in that decryption. Some implementations specify that m be greater than n/2, though this is not required. As stated, threshold cryptography is more fully described below in connection with various embodiments of the present disclosure.

One embodiment takes the form of a first method that is performed by an encryption system executing instructions on at least one hardware processor. The first method includes collecting at least a decryption-threshold number of private-key shares from a secure store, where the private-key shares correspond to a public key generated in a first secure enclave as part of a secret key set. The secret key set further includes a first plural quantity of the private-key shares. The first method additionally includes obtaining an eHSM-encryption key by decrypting the collected private-key shares. Furthermore, the first method includes initializing, in a second secure enclave, a second instance of a first eHSM, where the initialized second instance of the first eHSM is encrypted with the obtained eHISM-encryption key.

Another embodiment takes the form of a second method that is performed by an encryption system executing instructions on at least one hardware processor. The second method includes generating, in a first secure enclave on a secure computing platform, a secret key set that includes a public key, a first plural quantity of private-key shares that correspond to the public key, and a decryption threshold that is less than or equal to the first plural quantity. The second method also includes generating, in the first secure enclave, an eHSM-encryption key, and further includes encrypting, in the first secure enclave, the eHSM-encryption key with the public key.

The second method additionally includes storing, in a secure store that is external to the secure computing platform, the encrypted eHISM-encryption key as well as the first plural quantity of encrypted private-key shares that are each encrypted in the secure store with a different respective storage-encryption key. Furthermore, the second method includes initializing a first instance of a first eHSM in the first secure enclave, where the first instance of the first eHSM is encrypted with the eHSM-encryption key. The second method also includes collecting at least the decryption-threshold number of the private-key shares from the secure store, as well as decrypting the eHSM-encryption key with the collected private-key shares. The second method further includes initializing a second instance of the first eHSM in a second secure enclave, where the second instance of the first eHSM is also encrypted with the (decrypted) eHSM-encryption key.

As described herein, one or more embodiments of the present disclosure take the form of methods that include multiple operations. One or more other embodiments take the form of systems that include at least one hardware processor and that also include one or more non-transitory computer-readable storage media containing instructions that, when executed by the at least one hardware processor, cause the at least one hardware processor to perform multiple operations (that in some embodiments do and in other embodiments do not correspond to operations performed in a herein-disclosed method embodiment). Still one or more other embodiments take the form of one or more non-transitory computer-readable storage media (CRM) containing instructions that, when executed by at least one hardware processor, cause the at least one hardware processor to perform multiple operations (that, similarly, in some embodiments do and in other embodiments do not correspond to operations performed in a herein-disclosed method embodiment and/or operations performed by a herein-disclosed system embodiment).

Furthermore, a number of variations and permutations of embodiments are described herein, and it is expressly noted that any variation or permutation that is described in this disclosure can be implemented with respect to any type of embodiment. For example, a variation or permutation that is primarily described in this disclosure in connection with a method embodiment could just as well or instead be implemented in connection with a system embodiment and/or a CRM embodiment. Furthermore, this flexibility and cross-applicability of embodiments is present in spite of any slightly different language (e.g., processes, methods, methodologies, steps, operations, functions, and/or the like) that is used to describe and/or characterize such embodiments and/or any element or elements thereof.

Figure 2:
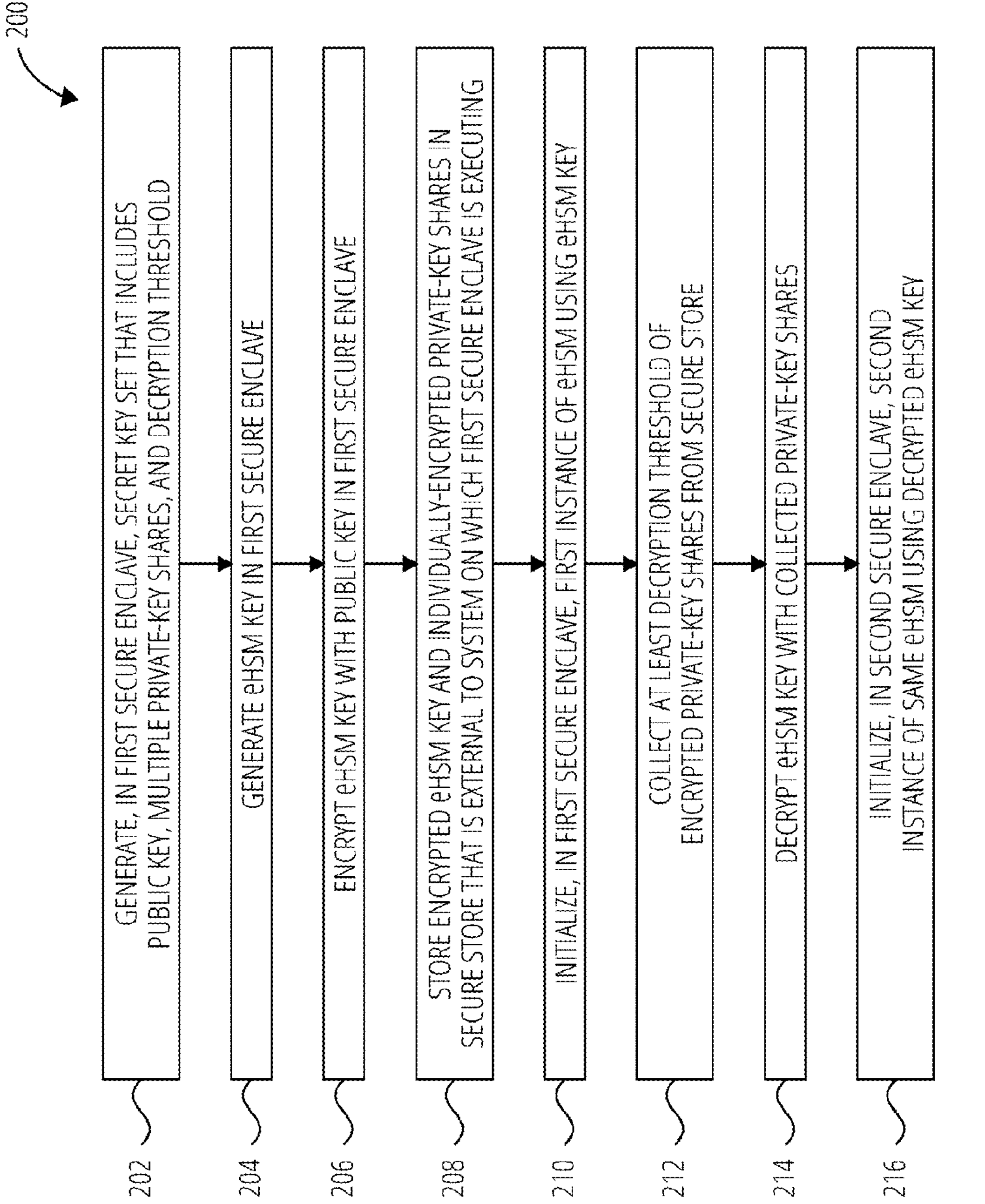
FIG. 2 depicts a second example method, in accordance with at least one embodiment.

FIG. 1 depicts a first example method 100, in accordance with at least one embodiment. Furthermore, it is noted at the outset of the description of the various drawings that FIG. 1 and FIG. 2 each depict a respective embodiment of a method in accordance with the present disclosure. In some ways, though not exactly, the example method 200 that is depicted in FIG. 2 is a superset of the example method 100 that is depicted in FIG. 1. In the description below, the method 100 is first described, and then the method 200 is described with reference to FIG. 3 and FIG. 4.

Moreover, in the present disclosure, the method 100 of FIG. 1 and the method 200 of FIG. 2 are described by way of example as being performed by what is referred to herein as an "encryption system." As a general matter, an encryption system could include any one or more computing devices having at least one hardware processor and further having stored instructions that, when executed by the at least one processor, cause the at least one processor to perform the described operations. In at least one embodiment, an encryption system has an architecture akin to that described in connection with the example computer system 500 of FIG. 5.

As will be appreciated by those of skill in the art having the benefit of the present disclosure, many of the operations that are described herein are actually performed in locations such as encrypted memory of a TEE managed by a cloud provider, a KMS, a secure store, and so forth. As such, in at least some embodiments of the present disclosure, one or more of the herein-described steps are performed by transmitting instructions to a given location, device, system, TEE, and/or the like, where the transmitted instructions cause the herein-described operations to be performed by a given entity, at a given location, and/or the like.

Turning now to FIG. 1, at operation 102, an encryption system collects at least a threshold number of private-key shares from a secure store. In at least one embodiment, the private-key shares correspond to a public key that had previously been generated—in a first secure enclave—as part of a secret key set, which also included a first plural quantity of the private-key shares. In some embodiments, a selection algorithm (e.g., pseudorandom selection) could be used to select a particular set of the private-key shares for use in a given decryption, typically resulting in different subsets of the private-key shares being used in various different decryption instances. In the present description of FIG. 1, as well as in the ensuing descriptions of FIG. 2, FIG. 3, and FIG. 4, the plural quantity of private-key shares in a given secret key set is represented as an integer n (where $n>1$). Moreover, in the descriptions of FIG. 1, FIG. 2, FIG. 3, and FIG. 4, the aforementioned threshold number of private-key shares is represented as an integer m (where $m \leq n$). In some embodiments, m is selected to be greater than (or greater than or equal to) n/2.

Operation 102 is quite similar to operation 212 in FIG. 2, and it should be understood that details provided below with respect to operation 212 could apply to operation 102 as well. The same goes for operation 104 in connection with operation 214 of the method 200, and for operation 106 in connection with operation 216 of the method 200. In the interest of avoiding duplicative descriptions, the reader is referred to the relevant passages below in connection with all three operations of the method 100.

It is briefly noted here that, at operation 104, the encryption system obtains an eHSM-encryption key by decrypting the private-key shares collected at operation 102. And it is further briefly noted here that, at operation 106, the encryption system initializes, in a second secure enclave, a second instance of a first eHSM. In at least one embodiment, the initialized second instance of the first eHSM is encrypted with the obtained eHSM-encryption key.

Figure 3:
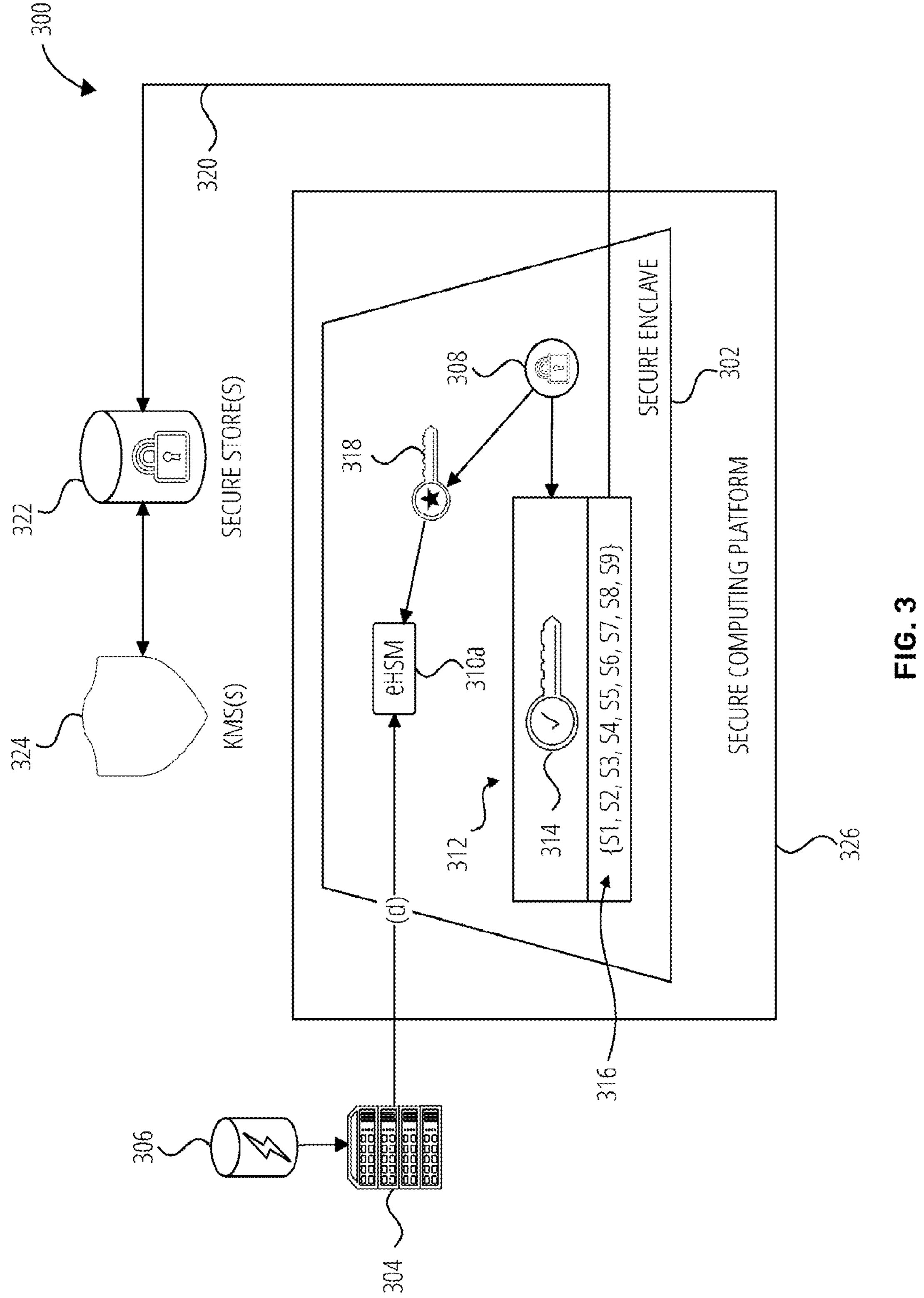
FIG. 3 depicts an example initialization diagram of what is referred to in the present disclosure as an "ephemeral HSM (eHSM)," in accordance with at least one embodiment.
Figure 4:
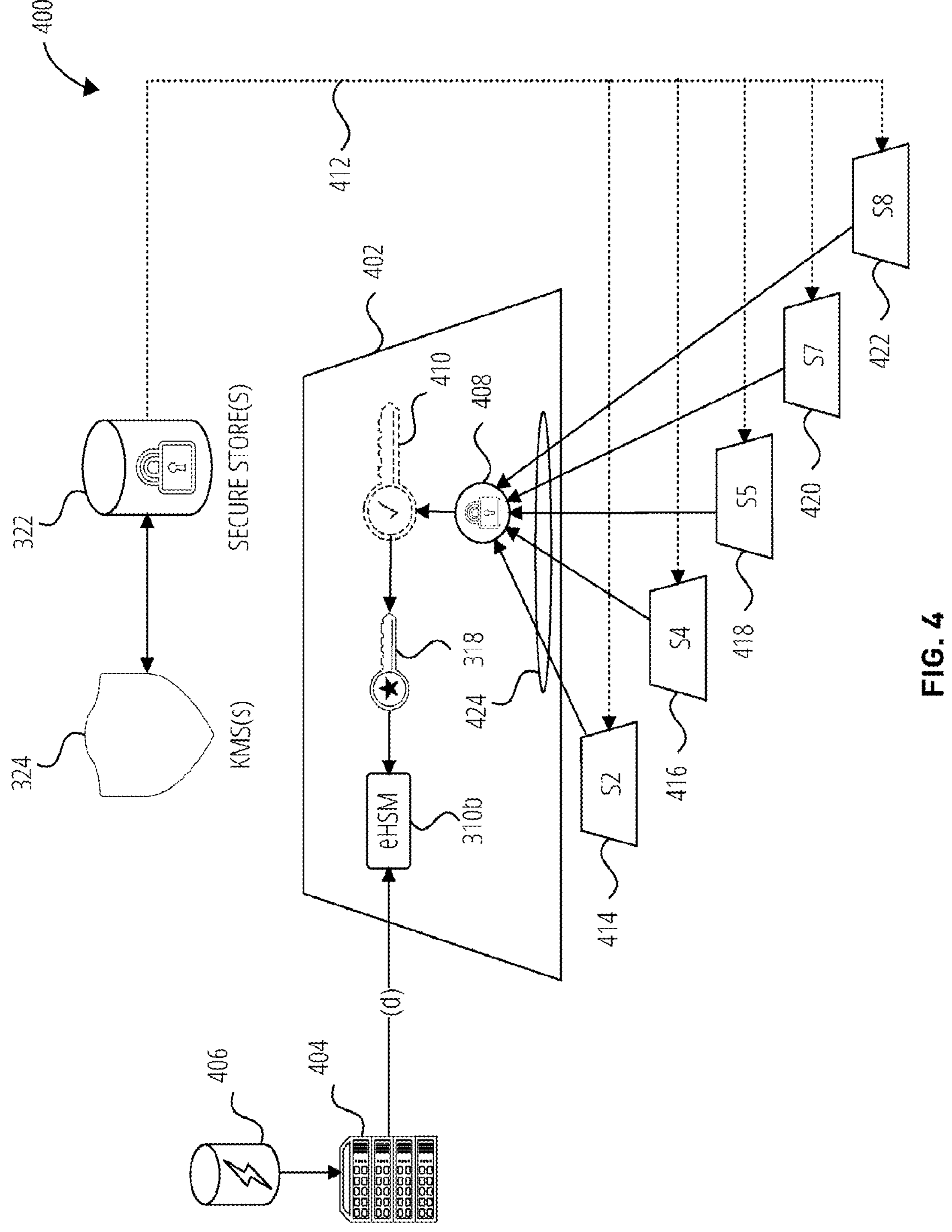
FIG. 4 depicts an example eHSM-reinitialization diagram, in accordance with at least one embodiment.

FIG. 2 depicts an example method 200, in accordance with at least one embodiment. As noted above, some of the operations of the method 200 are similar to operations of the method 100. Like the method 100, the method 200 is described here by way of example as being performed by an encryption system. As a general matter, either or both of the method 100 and the method 200 could be performed by any device or combination of devices, systems, and/or the like that is programmed to perform the herein-described functions. As also noted above, the method 200 of FIG. 2 is described below with reference to both FIG. 3 and FIG. 4. FIG. 3 depicts an example eHSM-initialization diagram 300, in accordance with at least one embodiment, whereas FIG. 4 depicts an example eHSM-reinitialization diagram 400, in accordance with at least one embodiment.

More plainly stated, in the example scenario described below, the eHSM-initialization diagram 300 of FIG. 3 relates to initializing a first instance of an example eHSM in an example first secure enclave, as well as to saving certain data in certain secure locations (outside of the system on which the first secure enclave is executing). By comparison, the eHSM-reinitialization diagram 400 of FIG. 4 relates to making use of those saved resources in order to actually start up a new instance of the same example eHSM. As noted above, that "reinitialization" of the eHSM could occur irrespective of whether or not the initial instance (and/or one or more others) is still executing. Thus, the reinitialization could be post-outage, related to load-balancing strategies, related to parallel-computing approaches, and/or the like. More than one instance of a given eHSM could be executing at any given time on one secure-computing platform or on more than one. Such variations will occur to those of skill in the art having the benefit of this disclosure.

As can be seen in the example eHSM-initialization diagram 300 of FIG. 3, in an example scenario, a secure enclave 302 may be executing on a secure computing platform 326. Moreover, the secure enclave 302 may be able to store encrypted data in one or more secure stores 322, which in at least some aspects may be managed by one or more key-management services 324. At the snapshot in time that is depicted in FIG. 3, an eHSM 310*a* is executing in the secure enclave 302. Also depicted is a diversifier server 304 that is operable to transmit cryptographic-diversifier values (labeled "(d)") from a diversifier database 306 to the eHSM 310*a*. Additional elements that are depicted in FIG. 3 are described more fully below.

Turning back now to FIG. 2 and also with reference to FIG. 3, at operation 202, the encryption system generates, in the secure enclave 302, a secret key set 312 that includes a public key 314, a plural quantity "n" (equal to 9, in this case) of private-key shares 316 that correspond to the public key 314, and a decryption threshold "m" (equal to 5 in this example, and not pictured). In at least one embodiment, the decryption threshold m is less than or equal to the plural quantity, and in some embodiments is greater than n/2. It is noted that the decryption threshold m is considered part of the secret key set 312 in some embodiments, and in other embodiments it is not. That is largely a matter of definition and not relevant to function. The secure enclave 302 may include a set of one or more cryptographic functions 308 that are operable to perform functions such as key-derivation functions (KDFs) and the like. The cryptographic functions 308 may be available to users of secure enclaves on the secure computing platform 326 to, as examples, generate individual encryption keys, generate secret key sets 312, and/or the like.

At operation 204, the encryption system generates (using, e.g., the cryptographic functions 308), in the secure enclave 302, an eHSM-encryption key 318. In at least one embodiment, it is the eHSM-encryption key 318 that will be used to initialize the eHSM 310*a* and that will further be also used to initialize later instantiations of substantively the same eHSM. The eHSM-encryption key 318 may be considered one of the most, and in some cases the most, sensitive (i.e., secret, confidential, etc.) of the various pieces of data that are discussed in the present disclosure.

At operation 206, the encryption system encrypts, in the secure enclave 302, the eHSM-encryption key 318 with the public key 314. This operation produces a cryptogram that contains the eHSM-encryption key 318. That cryptogram and the private-key shares 316 are depicted as being transmitted to the secure store 322, which is external to the secure computing platform 326, as what is referred to herein as a private-key-share-storage operation 320.

At operation 208 (which may include the aforementioned private-key-share-storage operation 320), the encryption system stores the encrypted eHSM-encryption key 318 in the secure store 322. In at least one embodiment, the encryption system also and separately stores, in the secure store 322, the n (in this example, 9) separate (and separately encrypted) private-key shares 316. In at least one embodiment, each of the stored encrypted private-key shares 316 is stored in the secure store 322 in a form that is encrypted with a different respective encryption key, referred to herein at times as a "storage-encryption key."

In some embodiments, the secure store 322 is managed at least in part by the key-management service 324. The KMS 324 may implement key rotation with respect to each of the encrypted and stored private-key shares 316. This could involve each of the shares cycling through being encrypted by different storage-encryption keys. The time periods could be every hour, every ten minutes, or whatever is deemed suitable by those of skill in the art for a given implementation.

Furthermore, in some embodiments, the KMS 324 is a multiregional KMS, and implements a geographic dispersion of the stored and encrypted private-key shares 316. Each of the private-key shares 316 may be stored in a different respective geographic region, or several may be stored together in one or more regions. Such are design choices available to those of skill in the art in various different contexts. The use of a different storage-encryption key for each private-key share 316, the use of key rotation, the use of geographic dispersion each contributes to enhancing the overall security provided by various different embodiments of the present disclosure. It is noted that different implementations may implement just one or two of those security measures, and that some implementations may implement one or more other security measures in addition to or instead of those described here.

At operation 210, the encryption system initializes, in the secure enclave 302, the eHSM 310*a*. In at least one embodiment, the eHSM 310*a* is encrypted with the eHSM-encryption key 318. Once the eHSM 310*a* is up and running, in at least one embodiment, the eHSM-encryption key 318 is then destroyed inside the secure enclave 302. The eHSM 310*a* may then run until terminated by a user, terminated by expiration of a timer, terminated by an outage-type event, or it may just keep running. This concludes the description of the initialization of the eHSM 310*a*, and it is noted that the private-key shares 316 are in place in the one or more secure store 322 as managed by the one or more KMSs 324.

Turning now to FIG. 4, at operation 212, the encryption system collects at least the decryption-threshold number (m) (5, in this example) of the encrypted private-key shares 316 from the secure store 322. As is known in the art of threshold cryptography, in order to successfully decrypt the previously encrypted information, at least the threshold number of shares need to be obtained. It is also noted that the threshold can vary from implementation to implementation. Some elements that are shown in FIG. 4 are the same as or similar to counterpart elements in FIG. 3, and accordingly are not described here in much introductory detail. Those elements include the secure store 322, the key-management service 324, the diversifier server 404, and the diversifier database 406. Some of the same keys are referenced as well, as discussed more fully below.

At operation 214, the encryption system decrypts the eHSM-encryption key with the collected private-key shares. As shown in FIG. 4, as part of the collecting in operation 212, six new secure enclaves have been initiated (or "spun up," as is said at times in the art). In the depicted example, these six new secure enclaves are a secure enclave 402, a secure enclave 414, a secure enclave 416, a secure enclave 418, a secure enclave 420, and a secure enclave 422. The secure enclave 402 is the one in which the eHSM will be reinitialized. Each of the others is a temporary secure enclave used to decrypt a different one of the collected private-key shares 316. As shown in FIG. 3, the private-key shares 316 are named "S1" through "S9," respectively. Moreover, by way of example only, FIG. 4 depicts the secure enclave 414 handling decryption of the share S2, the secure enclave 416 handling decryption of the share S4, the secure enclave 418 handling decryption of the share S5, the secure enclave 420 handling decryption of the share S7, and the secure enclave 422 is handling decryption of the share S8. It is not necessary that each share be decrypted in a different secure enclave.

Each of the secure enclaves 414-422 transmits its respective decryption result as part of what is labeled messaging 424 in FIG. 4. In at least one embodiment, each of the private-key shares 316 has an associated policy according to which only a valid secure enclave is permitted to conduct the decryption operation of the corresponding private-key share 316. Such a policy may be enforced at least in part through use of what is known in the art as a "cryptographic attestation." In various different embodiments, the respective ones of the secure enclaves 414-422 may be spun up in a geographic region in which its corresponding private-key share 316 had been encrypted and stored. In an embodiment, the decryption of operation 214 may be conducted using a distributed loop to iterate through individual ones of the secure enclaves 414-422. These operations may be managed from the secure enclave 402, which has cryptographic functions 408 available to its users, and each of the secure enclaves 414-422 may have permissions only to conduct decryption functions with respect to their assigned private-key share 316.

It is largely symbolic in FIG. 4 that a private key 410 is displayed in dashed lines between the cryptographic function 408 and the decrypted eHSM-encryption key 318. The intent of this illustration is to note that the herein-described threshold-cryptography operations collectively essentially result in assembly of a private key 410 corresponding to the public key 314 of FIG. 3. It is noted that, in accordance with embodiments of the present disclosure, the decryption of the eHSM-encryption key 318 would not be possible until at least m out of the n private-key shares 316 had been obtained. In at least some embodiments, prior to the collecting of the m out of the n shares, a selection algorithm (e.g., a pseudorandom-selection algorithm) is used to select which m out of the n shares will be used during that particular instance of decrypting the eHSM-encryption key 318, such that different combinations of m out of the n shares can be used in different instances. In at least one embodiment, each of the collected private-key shares 316 is destroyed (e.g., in its respective secure enclave) after they have served their respective decryption-related purpose.

At operation 216, the encryption system initializes, in the secure enclave 402, a second instance **310*b* of the eHSM 310*a* that was initialized in the secure enclave 302. As with the eHSM 310*a*, the eHSM 310*b*, in at least one embodiment, is encrypted with the decrypted eHSM-encryption key 318. The result is that, regardless of whether or not the eHSM 310*a* is still executing in the secure enclave 302, a second instance referred to herein as the eHSM 310*b* has been spun up using information that had been externally saved by the eHSM 310*a*. The eHSM 310*b* may similarly store external information to facilitate later (or contemporaneous) spinning up of additional instances of the eHSM 310*a*/310*b*. In at least one embodiment, the decrypted eHSM-encryption key 318 is destroyed in the secure enclave 402, the m secure enclaves 414-422 are destroyed, and the m collected private-key shares 316** are destroyed as well. Another term used in the art for this destroying is "cryptoshredding."

Embodiments of the present disclosure provide a number of advantages. One such advantage is that any possible attack window is reduced due to the ephemeral nature of the eHSMs. If a given secure enclave was attacked, it could simply be cryptoshredded and a new secure enclave (or enclaves) could be spun up to provide the associated function for which the eHSM was initialized in the first place. Moreover, it is further noted that, in such an instance, the parent enclave of the newly spun-up child enclave provides a type of physical security. It is technically difficult to successfully traverse the hardware protection of the secure enclave by accessing the host machine of the cloud provider. Generally, it is not possible (or at least not feasible) to identify a parent-enclave instance from the level of a child-enclave instance, and such an identification would typically be needed in order to identify a physical location of the host machine of the parent-enclave instance.

Naturally, another advantage is in the function of being able to spin up copies of previously initialized eHSMs in whatever numbers are deemed suitable in a given context. The approaches of the various embodiments of the present disclosure also represent options that are significantly less costly and significantly less complex than attempting to achieve similar functionality with actual HSMs instead of eHSMs. The eHSMs-based solutions are readily scalable as well.

Moreover, in some embodiments, a multiregional service can be offered in parallel with the multiregional nature of the KMSs and secure stores in some embodiments as described above. A given instance of a given eHSM could be spun up as needed using embodiments of the present disclosure. The multiregional nature of such an eHSM-based service need not parallel any multiregional nature of the KSM/secure-store implementations, but they could.

Lastly, it is noted that the embodiments that are described in the present disclosure relate to encryption of substantive information, which as known in the art is a context in which an encryptor has access to a given public key and a decryptor has access to a corresponding private key. However, embodiments of the present disclosure can be converted or ported over to the digital-signature side of cryptography as well. As is known in the art, that context is one in which the public/private nature of the key use is reversed: the sender keeps a private signing key whereas the recipient uses a publicly available and corresponding public key to verify the digital signature. Applying eHISMs and threshold cryptography to the digital-signature side of cryptography is thus contemplated by the present disclosure. In that case, the relevant threshold would relate to how many private-key shares of a private signing key would be required in order to properly digitally sign a given transmission. Variations on these possibilities will occur to those of skill in the art having the benefit of the present disclosure.

Figure 5:
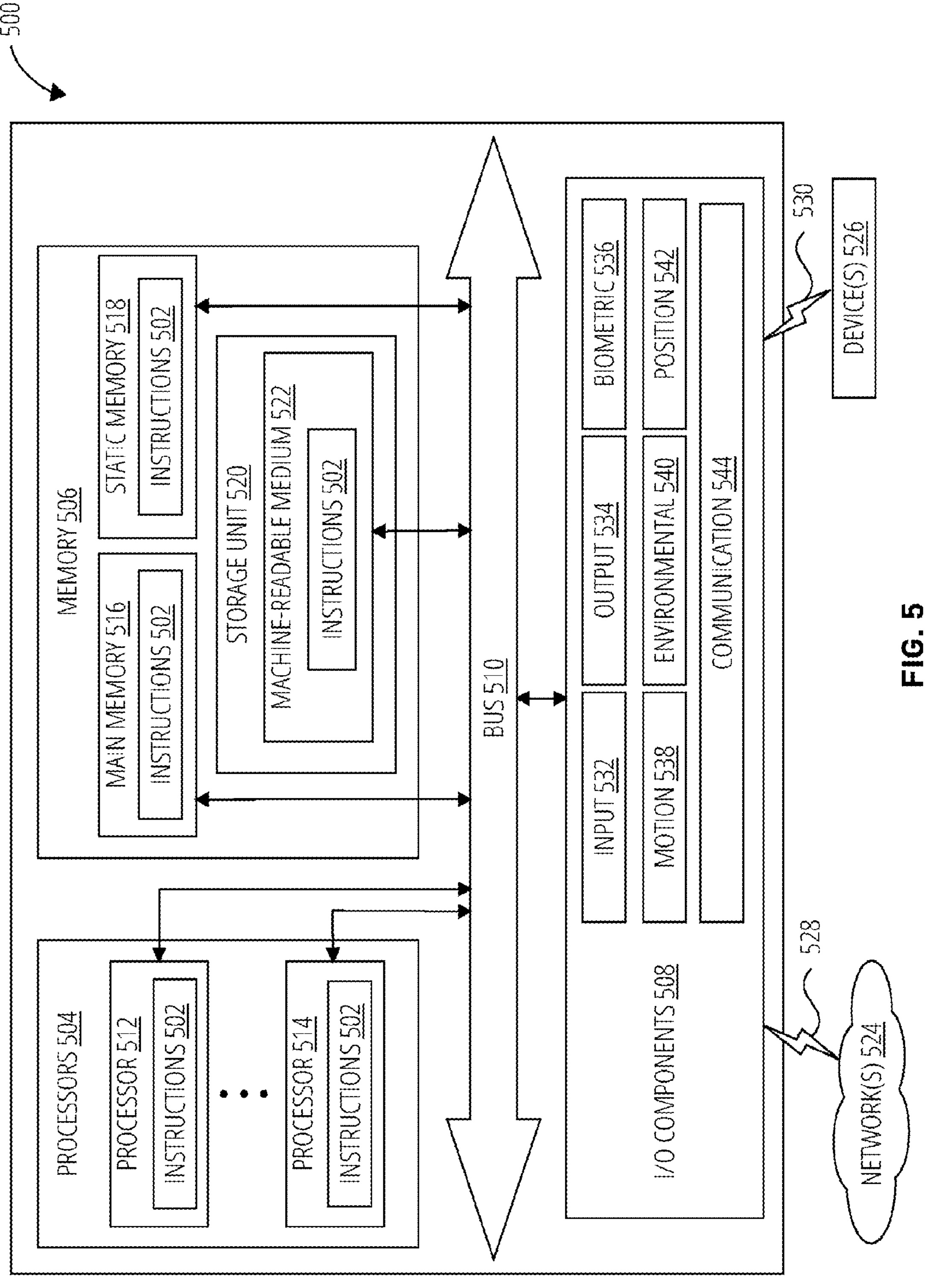
FIG. 5 depicts an example computer system, in accordance with at least one embodiment.

FIG. 5 depicts an example computer system 500 within which instructions 502 (e.g., software, firmware, a program, an application, an applet, an app, a script, a macro, and/or other executable code) for causing the computer system 500 to perform any one or more of the methodologies discussed herein may be executed. In at least one embodiment, execution of the instructions 502 causes the computer system 500 to perform one or more of the methods described herein. In at least one embodiment, the instructions 502 transform a general, non-programmed computer system into a particular computer system 500 programmed to carry out the described and illustrated functions. The computer system 500 may operate as a standalone device or may be coupled (e.g., networked) to and/or with one or more other devices, machines, systems, and/or the like. In a networked deployment, the computer system 500 may operate in the capacity of a server and/or a client in one or more server-client relationships, and/or as one or more peers in a peer-to-peer (or distributed) network environment.

The computer system 500 may be or include, but is not limited to, one or more of each of the following: a server computer or device, a client computer or device, a personal computer (PC), a tablet, a laptop, a netbook, a set-top box (STB), a personal digital assistant (PDA), an entertainment media system, a cellular telephone, a smartphone, a mobile device, a wearable (e.g., a smartwatch), a smart-home device (e.g., a smart appliance), another smart device (e.g., an Internet of Things (IoT) device), a web appliance, a network router, a network switch, a network bridge, and/or any other machine capable of executing the instructions 502, sequentially or otherwise, that specify actions to be taken by the computer system 500. And while only a single computer system 500 is illustrated, there could just as well be a collection of computer systems that individually or jointly execute the instructions 502 to perform any one or more of the methodologies discussed herein.

As depicted in FIG. 5, the computer system 500 may include processors 504, memory 506, and I/O components 508, which may be configured to communicate with each other via a bus 510. In an example embodiment, the processors 504 (e.g., a central processing unit (CPU), a Reduced Instruction Set Computing (RISC) processor, a Complex Instruction Set Computing (CISC) processor, a graphics processing unit (GPU), a digital signal processor (DSP), an application-specific integrated circuit (ASIC), a radio-frequency integrated circuit (RFIC), another processor, and/or any suitable combination thereof) may include, as examples, a processor 512 and a processor 514 that execute the instructions 502. The term "processor" is intended to include multi-core processors that may include two or more independent processors (sometimes referred to as "cores") that may execute instructions contemporaneously. Although FIG. 5 shows multiple processors 504, the computer system 500 may include a single processor with a single core, a single processor with multiple cores (e.g., a multi-core processor), multiple processors with a single core, multiple processors with multiples cores, or any combination thereof.

The memory 506, as depicted in FIG. 5, includes a main memory 516, a static memory 518, and a storage unit 520, each of which is accessible to the processors 504 via the bus 510. The memory 506, the static memory 518, and/or the storage unit 520 may store the instructions 502 executable for performing any one or more of the methodologies or functions described herein. The instructions 502 may also or instead reside completely or partially within the main memory 516, within the static memory 518, within machine-readable medium 522 within the storage unit 520, within at least one of the processors 504 (e.g., within a cache memory of a given one of the processors 504), and/or any suitable combination thereof, during execution thereof by the computer system 500. In at least one embodiment, the machine-readable medium 522 includes one or more non-transitory computer-readable storage media.

Furthermore, also as depicted in FIG. 5, I/O components 508 may include a wide variety of components to receive input, produce and/or provide output, transmit information, exchange information, capture measurements, and/or the like. The specific I/O components 508 that are included in a particular instance of the computer system 500 will depend on the type of machine. For example, portable machines such as mobile phones may include a touch input device or other such input mechanisms, while a headless server machine may not include such a touch input device. Moreover, the I/O components 508 may include many other components that are not shown in FIG. 5.

In various example embodiments, the I/O components 508 may include input components 532 and output components 534. The input components 532 may include alphanumeric input components (e.g., a keyboard, a touchscreen configured to receive alphanumeric input, a photo-optical keyboard, and/or other alphanumeric input components), pointing-based input components (e.g., a mouse, a touchpad, a trackball, a joystick, a motion sensor, and/or one or more other pointing-based input components), tactile input components (e.g., a physical button, a touchscreen that is responsive to location and/or force of touches or touch gestures, and/or one or more other tactile input components), audio input components (e.g., a microphone), and/or the like. The output components 534 may include visual components (e.g., a display such as a plasma display panel (PDP), a light emitting diode (LED) display, a liquid crystal display (LCD), a projector, and/or a cathode ray tube (CRT)), acoustic components (e.g., speakers), haptic components (e.g., a vibratory motor, resistance mechanisms), other signal generators, and so forth.

In further example embodiments, the I/O components 508 may include, as examples, biometric components 536, motion components 538, environmental components 540, and/or position components 542, among a wide array of possible components. As examples, the biometric components 536 may include components to detect expressions (e.g., hand expressions, facial expressions, vocal expressions, body gestures, eye tracking, and/or the like), measure biosignals (e.g., blood pressure, heart rate, body temperature, perspiration, brain waves, and/or the like), identify a person (by way of, e.g., voice identification, retinal identification, facial identification, fingerprint identification, electroencephalogram-based identification and/or the like), etc. The motion components 538 may include acceleration-sensing components (e.g., an accelerometer), gravitation-sensing components, rotation-sensing components (e.g., a gyroscope), and/or the like.

The environmental components 540 may include, as examples, illumination-sensing components (e.g., a photometer), temperature-sensing components (e.g., one or more thermometers), humidity-sensing components, pressure-sensing components (e.g., a barometer), acoustic-sensing components (e.g., one or more microphones), proximity-sensing components (e.g., infrared sensors, millimeter-(mm)-wave radar) to detect nearby objects), gas-sensing components (e.g., gas-detection sensors to detect concentrations of hazardous gases for safety and/or to measure pollutants in the atmosphere), and/or other components that may provide indications, measurements, signals, and/or the like that correspond to a surrounding physical environment. The position components 542 may include location-sensing components (e.g., a Global Navigation Satellite System (GNSS) receiver such as a Global Positioning System (GPS) receiver), altitude-sensing components (e.g., altimeters and/or barometers that detect air pressure from which altitude may be derived), orientation-sensing components (e.g., magnetometers), and/or the like.

Communication may be implemented using a wide variety of technologies. The I/O components 508 may further include communication components 544 operable to communicatively couple the computer system 500 to one or more networks 524 and/or one or more devices 526 via a coupling 528 and/or a coupling 530, respectively. For example, the communication components 544 may include a network-interface component or another suitable device to interface with a given network 524. In further examples, the communication components 544 may include wired-communication components, wireless-communication components, cellular-communication components, Near Field Communication (NFC) components, Bluetooth (e.g., Bluetooth Low Energy) components, Wi-Fi components, and/or other communication components to provide communication via one or more other modalities. The devices 526 may include one or more other machines and/or any of a wide variety of peripheral devices (e.g., a peripheral device coupled via a universal serial bus (USB) connection).

Moreover, the communication components 544 may detect identifiers or include components operable to detect identifiers. For example, the communication components 544 may include radio frequency identification (RFID) tag reader components, NFC-smart-tag detection components, optical-reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and/or other optical codes), and/or acoustic-detection components (e.g., microphones to identify tagged audio signals). In addition, a variety of information may be derived via the communication components 544, such as location via IP geolocation, location via Wi-Fi signal triangulation, location via detecting an NFC beacon signal that may indicate a given location, and/or the like.

One or more of the various memories (e.g., the memory 506, the main memory 516, the static memory 518, and/or the (e.g., cache) memory of one or more of the processors 504) and/or the storage unit 520 may store one or more sets of instructions (e.g., software) and/or data structures embodying or used by any one or more of the methodologies or functions described herein. These instructions (e.g., the instructions 502), when executed by one or more of the processors 504, cause performance of various operations to implement various embodiments of the present disclosure.

The instructions 502 may be transmitted or received over one or more networks 524 using a transmission medium, via a network-interface device (e.g., a network-interface component included in the communication components 544), and using any one of a number of transfer protocols (e.g., the Session Initiation Protocol (SIP), the HyperText Transfer Protocol (HTTP), and/or the like). Similarly, the instructions 502 may be transmitted or received using a transmission medium via the coupling 530 (e.g., a peer-to-peer coupling) to one or more devices 526. In some embodiments, IoT devices can communicate using Message Queuing Telemetry Transport (MQTT) messaging, which can be relatively more compact and efficient.

In view of the disclosure above, a listing of various examples of embodiments is set forth below. It should be noted that one or more features of an example, taken in isolation or combination, should be considered to be within the disclosure of this application.

Example 1 is a method that is performed by an encryption system executing instructions on at least one hardware processor. the method including: collecting at least a decryption-threshold number of private-key shares from a secure store, the private-key shares corresponding to a public key generated in a first secure enclave as part of a secret key set, the secret key set further including a first plural quantity of the private-key shares; obtaining an eHSM-encryption key by decrypting the collected private-key shares; and initializing, in a second secure enclave, a second instance of a first eHSM, the initialized second instance of the first eHSM being encrypted with the obtained eHSM-encryption key.

Example 2 is the method of Example 1, where the decryption-threshold number is greater than half of the first plural quantity.

Example 3 is the method of Example 1 or Example 2, where the secure store is external to a secure computing platform on which the second secure enclave is executing.

Example 4 is the method of any of the Examples 1-3, where: the private-key shares are stored in the secure store such that each private-key share is further encrypted in the secure store with a different respective storage-encryption key; and the respective storage-encryption keys are managed by a key-management service (KMS).

Example 5 is the method of Example 4, where the KMS includes a multiregional KMS that stores the encrypted private-key shares across multiple different geographic regions of the KMS.

Example 6 is the method of Example 4 or Example 5, where the KMS implements key rotation with respect to the storage-encryption keys.

Example 7 is the method of any of the Examples 1-6, further including generating the secret key set in the first secure enclave.

Example 8 is the method of any of the Examples 1-7, further including generating the eHSM-encryption key in the first secure enclave.

Example 9 is the method of Example 8, further including: encrypting, in the first secure enclave, the eHSM-encryption key with the public key; and transmitting the encrypted eHSM-encryption key to the secure store for storage therein.

Example 10 is the method of Example 8 or Example 9, further including initializing, in the first secure enclave, a first instance of the first eHSM, the initialized first instance of the first eHSM being encrypted with the eHSM-encryption key.

Example 11 is the method of any of the Examples 1-10, where decrypting the collected private-key shares includes instantiating a respective secure enclave for decrypting each of the collected private-key shares.

Example 12 is the method of any of the Examples 1-11, further including, prior to the collecting of the at least the decryption-threshold number of the private-key shares from the secure store, utilizing a pseudorandom-selection algorithm to select the at least the decryption-threshold number of the private-key shares from among the first plural quantity of the private-key shares Example 13 is an encryption system including: at least one hardware processor; and one or more non-transitory computer readable storage media containing instructions that, when executed by the at least one hardware processor, cause the at least one hardware processor to perform operations including: collecting at least a decryption-threshold number of private-key shares from a secure store, the private-key shares corresponding to a public key generated in a first secure enclave as part of a secret key set, the secret key set further including a first plural quantity of the private-key shares; obtaining an eHSM-encryption key by decrypting the collected private-key shares; and initializing, in a second secure enclave, a second instance of a first eHSM, the initialized second instance of the first eHSM being encrypted with the obtained eHSM-encryption key.

Example 14 is the encryption system of Example 13, where the decryption-threshold number is greater than half of the first plural quantity.

Example 15 is the encryption system of Example 13 or Example 14, where the secure store is external to a secure computing platform on which the second secure enclave is executing.

Example 16 is the encryption system of any of the Examples 13-15, where: the private-key shares are stored in the secure store such that each private-key share is further encrypted in the secure store with a different respective storage-encryption key; and the respective storage-encryption keys are managed by a key-management service (KMS).

Example 17 is the encryption system of Example 16, where the KMS includes a multiregional KMS that stores the encrypted private-key shares across multiple different geographic regions of the KMS.

Example 18 is the encryption system of Example 16 or Example 17, where the KMS implements key rotation with respect to the storage-encryption keys.

Example 19 is the encryption system of any of the Examples 13-18, the operations further including generating the secret key set in the first secure enclave.

Example 20 is the encryption system of any of the Examples 13-19, the operations further including generating the eHISM-encryption key in the first secure enclave.

Example 21 is the encryption system of Example 20, the operations further including: encrypting, in the first secure enclave, the eHSM-encryption key with the public key; and transmitting the encrypted eHSM-encryption key to the secure store for storage therein.

Example 22 is the encryption system of Example 20 or Example 21, the operations further including initializing, in the first secure enclave, a first instance of the first eHSM, the initialized first instance of the first eHSM being encrypted with the eHSM-encryption key.

Example 23 is the encryption system of any of the Examples 13-22, where decrypting the collected private-key shares includes instantiating a respective secure enclave for decrypting each of the collected private-key shares.

Example 24 is the encryption system of any of the Examples 13-23, the operations further including, prior to the collecting of the at least the decryption-threshold number of the private-key shares from the secure store, utilizing a pseudorandom-selection algorithm to select the at least the decryption-threshold number of the private-key shares from among the first plural quantity of the private-key shares.

Example 25 is one or more non-transitory computer readable storage media containing instructions that, when executed by at least one hardware processor, cause the at least one hardware processor to perform operations including: collecting at least a decryption-threshold number of private-key shares from a secure store, the private-key shares corresponding to a public key generated in a first secure enclave as part of a secret key set, the secret key set further including a first plural quantity of the private-key shares; obtaining an eHSM-encryption key by decrypting the collected private-key shares; and initializing, in a second secure enclave, a second instance of a first eHSM, the initialized second instance of the first eHSM being encrypted with the obtained eHSM-encryption key.

Examples 26 through 36 are parallel to the Examples 14 through 24, though in the form of one or more non-transitory computer readable storage media.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

As used in this disclosure, including in the claims, phrases of the form "at least one of A and B," "at least one of A, B, and C," and the like should be interpreted as if the language "A and/or B," "A, B, and/or C," and the like had been used in place of the entire phrase. Unless explicitly stated otherwise in connection with a particular instance, this manner of phrasing is not limited in this disclosure to meaning only "at least one of A and at least one of B," "at least one of A, at least one of B, and at least one of C," and so on. Rather, as used herein, the two-element version covers each of the following: one or more of A and no B, one or more of B and no A, and one or more of A and one or more of B. And similarly for the three-element version and beyond. Similar construction should be given to such phrases in which "one or both," "one or more," and the like is used in place of "at least one," again unless explicitly stated otherwise in connection with a particular instance.

Furthermore, in this disclosure, in one or more embodiments, examples, and/or the like, it may be the case that one or more components of one or more devices, systems, and/or the like are referred to as modules that carry out (e.g., perform, execute, and the like) various functions. With respect to any such usages in the present disclosure, a module includes both hardware and instructions. The hardware could include one or more processors, one or more microprocessors, one or more microcontrollers, one or more microchips, one or more application-specific integrated circuits (ASICs), one or more field programmable gate arrays (FPGAs), one or more graphical processing units (GPUs), one or more tensor processing units (TPUs), and/or one or more devices and/or components of any other type deemed suitable by those of skill in the art for a given implementation.

In at least one embodiment, the instructions for a given module are executable by the hardware for carrying out the one or more herein-described functions of the module, and could include hardware (e.g., hardwired) instructions, firmware instructions, software instructions, and/or the like, stored in any one or more non-transitory computer-readable storage media deemed suitable by those of skill in the art for a given implementation. Each such non-transitory computer-readable storage medium could be or include memory (e.g., random access memory (RAM), read-only memory (ROM), erasable programmable read-only memory (EPROM), electrically erasable programmable read-only memory (EE-PROM a.k.a. E2PROM), flash memory, and/or one or more other types of memory) and/or one or more other types of non-transitory computer-readable storage medium. A module could be realized as a single component or be distributed across multiple components. In some cases, a module may be referred to as a unit.

Moreover, consistent with the fact that the entities and arrangements that are described herein, including those depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

What is claimed is:

1. A method performed by an encryption system executing instructions on at least one hardware processor, the method comprising:

collecting at least a decryption-threshold number of private-key shares from a secure store, the private-key shares corresponding to a public key generated in a first secure enclave as part of a secret key set, the secret key set further comprising a first plural quantity of the private-key shares;

obtaining an ephemeral-hardware-security-module-(eHSM)-encryption key by decrypting the collected private-key shares; and initializing, in a second secure enclave, a second instance of a first soft eHSM, the initialized second instance of the first soft eHISM being encrypted with the obtained eHSM-encryption key.

2. The method of claim 1, wherein the decryption-threshold number is greater than half of the first plural quantity.

3. The method of claim 1, wherein the secure store is external to a secure computing platform on which the second secure enclave is executing.

4. The method of claim 1, wherein:

the private-key shares are stored in the secure store such that each private-key share is further encrypted in the secure store with a different respective storage-encryption key; and the respective storage-encryption keys are managed by a key-management service (KMS).

5. The method of claim 4, wherein the KMS comprises a multiregional KMS that stores the encrypted private-key shares across multiple different geographic regions of the KMS.

6. The method of claim 4, wherein the KMS implements key rotation with respect to the storage-encryption keys.

7. The method of claim 1, further comprising generating the secret key set in the first secure enclave.

8. The method of claim 1, further comprising generating the eHSM-encryption key in the first secure enclave.

9. The method of claim 8, further comprising:

encrypting, in the first secure enclave, the eHSM-encryption key with the public key; and transmitting the encrypted eHSM-encryption key to the secure store for storage therein.

10. The method of claim 8, further comprising initializing, in the first secure enclave, a first instance of the first soft eHSM, the initialized first instance of the first soft eHSM being encrypted with the eHSM-encryption key.

11. The method of claim 1, wherein decrypting the collected private-key shares comprises instantiating a respective secure enclave for decrypting each of the collected private-key shares.

12. The method of claim 1, further comprising, prior to the collecting of the at least the decryption-threshold number of the private-key shares from the secure store:

utilizing a pseudorandom-selection algorithm to select the at least the decryption-threshold number of the private-key shares from among the first plural quantity of the private-key shares.

13. An encryption system comprising:

at least one hardware processor; and one or more non-transitory computer readable storage media containing instructions that, when executed by the at least one hardware processor, cause the at least one hardware processor to perform operations comprising:

collecting at least a decryption-threshold number of private-key shares from a secure store, the private-key shares corresponding to a public key generated in a first secure enclave as part of a secret key set, the secret key set further comprising a first plural quantity of the private-key shares;

obtaining an ephemeral-hardware-security-module-(eHSM)-encryption key by decrypting the collected private-key shares; and initializing, in a second secure enclave, a second instance of a first soft eHSM, the initialized second instance of the first soft eHSM being encrypted with the obtained eHSM-encryption key.

14. The encryption system of claim 13, wherein the decryption-threshold number is greater than half of the first plural quantity.

15. The encryption system of claim 13, wherein the secure store is external to a secure computing platform on which the second secure enclave is executing.

16. The encryption system of claim 13, wherein:

the private-key shares are stored in the secure store such that each private-key share is further encrypted in the secure store with a different respective storage-encryption key; and the respective storage-encryption keys are managed by a key-management service (KMS).

17. The encryption system of claim 16, wherein the KMS comprises a multiregional KMS that stores the encrypted private-key shares across multiple different geographic regions of the KMS.

18. The encryption system of claim 16, wherein the KMS implements key rotation with respect to the storage-encryption keys.

19. The encryption system of claim 13, the operations further comprising generating the secret key set in the first secure enclave.

20. The encryption system of claim 13, the operations further comprising generating the eHSM-encryption key in the first secure enclave.

21. The encryption system of claim 20, the operations further comprising:

encrypting, in the first secure enclave, the eHSM-encryption key with the public key; and transmitting the encrypted eHSM-encryption key to the secure store for storage therein.

22. The encryption system of claim 20, the operations further comprising initializing, in the first secure enclave, a first instance of the first soft eHSM, the initialized first instance of the first soft eHSM being encrypted with the eHSM-encryption key.

23. The encryption system of claim 13, wherein decrypting the collected private-key shares comprises instantiating a respective secure enclave for decrypting each of the collected private-key shares.

24. The encryption system of claim 13, the operations further comprising, prior to the collecting of the at least the decryption-threshold number of the private-key shares from the secure store:

utilizing a pseudorandom-selection algorithm to select the at least the decryption-threshold number of the private-key shares from among the first plural quantity of the private-key shares.

25. One or more non-transitory computer readable storage media containing instructions that, when executed by at least one hardware processor, cause the at least one hardware processor to perform operations comprising:

collecting at least a decryption-threshold number of private-key shares from a secure store, the private-key shares corresponding to a public key generated in a first secure enclave as part of a secret key set, the secret key set further comprising a first plural quantity of the private-key shares;

obtaining an ephemeral-hardware-security-module-(eHSM)-encryption key by decrypting the collected private-key shares; and initializing, in a second secure enclave, a second instance of a first soft eHSM, the initialized second instance of the first soft eHSM being encrypted with the obtained eHSM-encryption key.

* * * * *